US 012171711B2

(12) United States Patent
Littwitz et al.

(10) Patent No.: US 12,171,711 B2
(45) Date of Patent: Dec. 24, 2024

(54) WALKING ASSISTING SYSTEMS AND METHODS

(71) Applicants: Elon Littwitz, Yuvalim (IL); Ron Lefeber, Haifa (IL); Gabi Horowitz, Koranit (IL)

(72) Inventors: Elon Littwitz, Yuvalim (IL); Ron Lefeber, Haifa (IL); Gabi Horowitz, Koranit (IL)

( * ) Notice: Subject to any disclaimer, the term of this patent is extended or adjusted under 35 U.S.C. 154(b) by 152 days.

(21) Appl. No.: 17/844,386

(22) Filed: Jun. 20, 2022

(65) Prior Publication Data

US 2022/0323285 A1 Oct. 13, 2022

Related U.S. Application Data

(63) Continuation-in-part of application No. PCT/IB2020/062258, filed on Dec. 19, 2020.

(60) Provisional application No. 62/952,244, filed on Dec. 21, 2019.

(51) Int. Cl.
*A61H 3/00* (2006.01)

(52) U.S. Cl.
CPC ......... *A61H 3/00* (2013.01); *A61H 2003/007* (2013.01); *A61H 2201/1604* (2013.01); *A61H 2201/5084* (2013.01); *A61H 2201/5092* (2013.01)

(58) Field of Classification Search
CPC .......... A61H 3/00; A61H 3/061; H04N 23/57; G06F 3/012; G06V 10/12; G06V 10/17; G06V 20/20; G06V 20/50
See application file for complete search history.

(56) References Cited

U.S. PATENT DOCUMENTS

| 8,953,841 | B1* | 2/2015 | Leblang | G06V 20/20 |
| | | | | 382/103 |
| 10,024,678 | B2* | 7/2018 | Moore | G01C 21/1656 |
| 11,328,154 | B2* | 5/2022 | Mejia Cobo | H04M 1/72454 |
| 2013/0123665 | A1 | 5/2013 | Mariani et al. | |
| 2013/0293586 | A1* | 11/2013 | Kaino | G06F 3/005 |
| | | | | 345/633 |
| 2015/0002374 | A1 | 1/2015 | Erinjippurath et al. | |
| 2015/0241708 | A1 | 8/2015 | Watanabe et al. | |
| 2015/0355709 | A1 | 12/2015 | Lee et al. | |
| 2016/0335917 | A1 | 11/2016 | Lydecker et al. | |
| 2017/0202724 | A1 | 7/2017 | De Rossi et al. | |
| 2017/0323159 | A1* | 11/2017 | Cohen | G06V 20/64 |
| 2018/0129276 | A1 | 5/2018 | Nguyen et al. | |
| 2018/0225513 | A1* | 8/2018 | Bender | G06F 3/011 |

(Continued)

FOREIGN PATENT DOCUMENTS

| WO | 97/047993 | 12/1997 |
| WO | 2016/168047 | 10/2016 |

*Primary Examiner* — Daniel M Pasiewicz
(74) *Attorney, Agent, or Firm* — The Law Office of Joseph L. Felber

(57) ABSTRACT

A walking assisting system for a user. The system includes first and second sub-systems each having at least one optical sensor, for example a camera. The first sub-system is fitted to the user's abdomen region, for example waist, and the second sub-system is fitted to the user's head region, for example eyes. The system is arranged to align between data obtained from optical sensors of the first and second sub-systems in order to indicate to the user presence of obstacles detected by the first sub-system in a coordinate system of the second sub-system.

18 Claims, 9 Drawing Sheets

(56) References Cited

U.S. PATENT DOCUMENTS

2018/0239428 A1 8/2018 Maheriya
2019/0332175 A1* 10/2019 Väänänen .............. G06V 20/20

* cited by examiner

WALKING ASSISTING SYSTEMS AND METHODS

TECHNICAL FIELD

Embodiments of the invention relate to walking assisting systems and methods, in particular for providing a user with information on details in his/her path.

BACKGROUND

People may tend to not notice obstacles in their route resulting in injury or inconvenience. Such tendency may increase e.g. when aging and/or when encountering a disability. For example, while walking on a surface substantially free of obstacles, a tendency may be to glance downwards, and when the surface is less convenient—the time spent looking downwards may increase. When a mature or disabled individual misses to identify and react in time to an obstacle, unnecessary falls and injuries may relatively often occur. Various solutions are available for assisting old people and disabled users with walking or reacting to their environment.

US2019125587 for example describes a system for assisting the visually impaired that includes one or more distance sensors, one or more electronic storage devices, one or more processors, and an output component. The distance sensors are configured to make distance measurements between the distance sensor and one or more objects and the electronic storage devices are operable to store boundaries defining a three-dimensional space. A processor may be used for generating output signals related to the received measurements within the defined three-dimensional space.

U.S. Pat. No. 10,134,304 in a further example describes an arrangement for avoiding obstacles for visually-impaired pedestrians. Distance measurements may be created and analyzed to identify an obstacle and based on such identifications of obstacles, indications may be provided to a pedestrian.

US2015323325 in yet a further example describes a computer-implemented method and a navigation system for guiding a visually impaired user to avoid obstructions and impediments while walking. The user may wear a plurality of subassemblies of the system. The tilt and rotation of the user's head may be monitored using one of the subassemblies worn on the user's head. Based at least in part on the tilt and rotation of the user's head, vertical and horizontal firing angles used by a distance measuring unit in each of the subassemblies may be calculated to transmit and receive laser signals to perform measurements.

SUMMARY

The following embodiments and aspects thereof are described and illustrated in conjunction with systems, tools and methods which are meant to be exemplary and illustrative, not limiting in scope.

In a broad aspect, at least certain embodiments of the present invention may be defined as relating to assisting a person in walking and/or moving by providing wider and/or additional fields or view and/or indications of expected element(s) in a walking route that lie possibly ahead or transverse to direction of advancement and/or outside of his/her eye-sight—possibly as virtual indications in the field of view of such person's eye sight or physical warning signals such as vibration or audio An 'element' may be characterized as a potential 'obstacle' that may interfere or pose likelihood of interference in a person's walking path. Obstacles may be any one of: an inanimate object (e.g. tree, etc.), a moving object (e.g. human, animal, bouncing ball, etc.), a potential walking hazard (e.g. a mudded, or ice covered pavement, etc.), and the like—and hence from here on use of the term 'obstacle' may refer to any one of the above.

Further example to obstacles may include: changes in the height of the walking surface (e.g. step, pit, curb, uneven height, etc.), changes in the friction coefficients of the walking surface (e.g. wet area, mud, dirt on the pavement, etc.), gradient on the walking surface, objects on the walking surface (e.g. chair, table, pillar, stone etc.), Soft Texture Teeth (e.g. Carpet, Mop, Phone Cable), an animal or a person at home (like a cat, dog) or outdoor.

In at least certain embodiments there may be provided a method and/or system for identifying obstacles in a walking path that may relate to the position and/or orientation of where a foot of a user may be laid down on a ground surface and/or a projected path/route that a foot may traverse to perform a walking step (possibly an expected step to be performed—e.g. an expected step that will be taken three steps from now or the like).

In some cases, information relating to detected obstacles or occurrences ahead of a user may be presented to the user as a virtual object that highlights an obstacle on the ground or virtually on the ground in relative high accuracy. Possibly such highlighting of an obstacle may be via indicating a symbol around the obstacle. Preferably, such indications may be in real-time possibly also when he is in motion. In some cases, decision of what information to present to a user may be dependent on his/her distance from an obstacle and may be provided in the form of a guidance indicating where he/she should avoid putting his/her foot.

In an aspect of the invention, an embodiment of a system/method for assisting in walking may be arranged to classify detected data and/or information sensed (e.g. imaged or the like). Such classification may be aimed as assessing if, e.g., such data and/or information may be characterized as "obstacles".

A detected obstacle may be positioned relative to a current (real-time) location of a person possibly also when in motion, and possibly presented in a virtual manner on the walking surface according to his/her distance from the obstacle—e.g. using augmented reality means. In certain embodiments, such presentation may possibly be provided to a user in other means, such as in a mobile device associated and/or fitted to the user, such as a smart watch (or the like).

In at least certain embodiments, a system for detecting and/or assessing and/or indicating obstacles may not necessarily be static but rather movable and in motion. For example, such a system may be coupled to move together with a user by being fitted to one or more locations upon a user.

In at least certain embodiments, such system may include measures for example for predicting a location and/or timing that an obstacle may potentially pose a problem to a person—that takes into consideration issues such as delay time from obstacle detection by the person and his/her typical response time, which may be defined as depending on his/her physical condition. For example, a space tracker and/or a motion extrapolator may be employed in at least certain cases to tackle such issues and by that increase accuracy of e.g. mapping of objects in real-time upon a pathway of a person.

In certain cases, virtual objects may be mapped on a walkway surface ahead and/or in a vicinity of a person and displayed in real-time to the person, while a reference location for such mapping may be the person's place (which may accordingly be in motion).

In an aspect of the present invention, a realization of a system according to at least certain embodiments—may include a definition of two Cartesian coordinate systems. A first "beacon" coordinate system may be defined including a "beacon-axis" generally aimed at a direction of advancement of a user; and a second "vision" coordinate system may be defined including a "vision-axis" coupled to the direction of eye sight of the person.

Implementation of two such axes in at least certain systems of the present invention may be useful since the eyes of a person may not necessarily always point/look and/or focus on a direction where an obstacle may be present or appear to a person—such as a direction of advancement during walking, and in some cases vision problems and/or cognitive problems of a person may also undermine ability to notice obstacles.

Studies indicate that while walking on a surface substantially free of obstacles, people tend to glance downwards towards the surface they are walking upon about 50% of the time, and when the surface is less convenient for walking (e.g. with obstacles) people tend to look downwards about 90% of the time, focusing most of their attention on the next one or two steps ahead.

When a person matures in age and/or encounters difficulty in walking, the glance downwards towards the ground increases likelihood of missing to identify obstacles in time in the route ahead, and thus react to such sudden appearing obstacles possibly too late.

Therefore, a system's beacon-axis directed to gathering data relating to the direction of walking—may assist in obtaining information relating to such potential obstacles ahead and in return provide feedback regarding same in a reasonable distance/time in advance so that e.g. a pedestrian can respond in time. Thus, in an aspect of the invention, such beacon-axis may be defined as increasing a generally forward looking horizontal field of view of a user.

Thus, in at least certain embodiments, realization of a system according to the present invention may be envisioned as including generally two sub-systems. A first sub-system being generally rigidly fixed to a person and generally aimed as a direction of advancement to facilitate provision of such beacon-axis and a second sub-system being adjacently located close to the person's eyes and aimed as his/her direction of eye-sight to provide such vision-axis.

Thus one of the axes (here beacon-axis) may be always or mostly aimed at a direction of advancement of a person while the other axis (here vision-axis) may not necessarily be aimed or focused at the direction of advancement (e.g. may be aimed downwards, sideways, or unfocused by e.g. suffering from vision or cognitive problems, or the like).

In an aspect of the present invention, at least certain system embodiments may include measures (e.g. executed on a processor within the system) for aligning and adjusting sensed data obtained along the two axes and/or in relation to the 'beacon' and 'vision' coordinate systems.

Such sensed data may be obtained in one example from sensors (e.g. cameras) that image scenes along the beacon and vision axes. In certain cases, such streams of image data obtained along or in relation to the axes—may have different magnifications, and/or different angles of view (etc.) that require adjustment.

Thus, in certain embodiments—data streams relating to such axes and/or coordinate systems may be processed to detect common features such as a detection in both data streams of one or more common coordinates. For example, matching between image streams (e.g. a pair of images having a similar time stamp taken each from a different image stream) arriving from cameras aimed at providing image(s) each along one of the axes—may be performed by identifying correlating points in image pairs obtained along the two axes—in order to transform features from one image to the other so that they are in the same coordinate system.

In addition or alternatively, in certain cases such alignment between the axes and/or coordinate systems may be assisted by using inertial measurement units (IMU) coupled each to a respective one of the 'beacon' or 'vision' axes. In an embodiment, an IMU may be arranged to detect linear acceleration using one or more accelerometers and rotational rate using one or more gyroscopes. Possibly one IMU may be associated to each axis in each one of the 'beacon' or 'vision' coordinate systems in order to track the coordinate systems as they move in space. Such tracking may be useful in cases where e.g. computing time for executing the aforementioned correlation may be too long or will consume too much energy for providing results that can assist a person in safely taking a next step during walking.

In at least certain embodiments, a system's architecture may embody the two sub-systems associated each respectively with one of the axes and/or coordinate systems ('beacon' and 'vision')—as a first waist mounted sub-system (e.g. belt-mounted sub-system) geared for sensing information generally along a walking direction and hence generally along a 'beacon'-axis; and a second head sub-system coupled to an eye sight of a person for sensing information generally along a field of view of vision of the person and hence generally along a 'vision'-axis.

In certain embodiments, the first sub-system (providing beacon-axis) may accordingly be attached to a waist of a person, e.g. may be embodied as a belt-attached sub-system that preferably fits an adult for daily personal use and preferably is designed with appropriate weight distribution on the waist. The second sub-system (providing the vision-axis) may preferably be light in weight in order to substantially not affect (or as little as possible) a person's normal function at his/her head region.

In certain cases, the first sub-system may be embodied as a module that is installed on a belt, or on a carrying case, or a dedicated belt or dedicated bag (and the like). Such first sub-system in some cases may be defined as carried/supported at a center of a person's abdomen (possibly generally oriented horizontally about at least part of the abdomen), or on the sides of a person's body (possibly generally oriented vertically along the side).

In certain cases, the first sub-system may include a sensor in form of a depth camera (such as the '"Realsense" product/technology of Intel Corporation). Such sensor in some cases may have a field of view directed towards a ground face with the ability to image one's feet. In addition, the first sub-system may include any one of the following: one or more Inertial Measurement Units (IMU), GPS, Gyro means, a main processor, such as Snapdragon high performance processor of Qualcomm Technologies Inc., or GPU, a communication module, a power source, possible Laser Scanner, possible Foot Camera, possible Acoustic Sensor, Optional camera(s) directed sideways.

In certain cases, IMU(s) may be installed anywhere e.g. anywhere along a belt in embodiments where the first sub-system if a waist sub-system. Acoustic sensor(s) may be installed throughout a belt in such waist sub-system configuration to possibly sense by acoustic waves obstacles ahead, backwards, or generally aside of the user. Optional side and possible back cameras may be installed anywhere on a belt in said same waist sub-system configuration.

The second sub-system may be located close to a user's eyes. In certain cases, the second sub-system may be embodied by augmented reality (AR) technology. Possibly, such AR based second sub-system may include lens with adjustable angles mounted on glasses to possibly split the angle of view, such as in the technology available in the ORA-2 smart glasses of Optinvent. In another example, such AR based second sub-system may be full AR glasses, such as the Vuzix blade AR glasses.

An AR based second sub-system may include any one of the following: camera, one or more IMUs, a Gyro option, a secondary processor, a communication module, power source, possible earphone and/or vibrating wrist interface for alerting a person using the system e.g. about obstacles. In one example, the purpose of an adjustable lens may be in provision of ability to adjust e.g. an area where AR data may be provided at any angle with respect to a normal field of view of the person. One may thus be able to position AR information in any part of a regular field of view, or may extend the field of view of a user in directions such as upwards or downwards towards a user's feet.

In certain embodiments, the first sub-system may include a laser scanner installed possibly on a belt as part of the sub-system or any other location adjacent to a waist region of the user.

In at least certain embodiments, a mobile device may be used in a system or in conjunction with a system in order to indicate (possibly on a screen of the mobile device) information pertaining to obstacles (e.g. the obstacle itself, indication to location of an obstacle, etc.).

In at least certain embodiments, the second sub-system may be coupled to locations other than glasses/spectacles of a user, such as to a hat or helmet of a user (or the like). In certain cases, the second sub-system may be embodied as comprising a graphic display that describes/displays a close environment of a walking person. Such graphic display may be tuned to indicate/show to a user a location of an obstacle e.g. in his/her walking route. In a non-binding example, such graphic display may be implemented into and/or as a wrist watch. In such case, the wrist watch may also comprise a vibrating member for indicating to the user presence of an obstacle by vibration.

In at least some embodiments, a system may comprise additional sensors, such as blood pressure sensors possibly on a bracelet/watch of a user (or the like).

In an aspect of the present invention, detection of obstacles, and their location on or relative to a walking path may be defined according to a camera's resolution which can be any standard or HD resolution. Obstacles may be displayed in their substantial exact location on the walking path as a person moves.

In at least certain embodiments, the first sub-system may be adapted to identify footpath-dependent obstacles and map them substantially exactly by pixels on the walking path as viewed in image(s) obtained by a camera of the first sub-system. The second sub-system may be adapted to display such detected obstacles to the human eye, in substantially the exact same spot, as the human moves. That is, the markings of the obstacles remain in their proper place in the human's field of view despite human movement.

Embodiments of system according to the present invention may be arranged to function when a person is in motion, and hence such systems may be configured to act in real time, overcoming disturbances such as unstable images which may occur due to body movement and vibration during a person's movement.

In certain cases, processing of gathered information may take a while (e.g. several milliseconds), and thus processed data may be indicative of a person's prior (and not current) location. For example, such processed data may be indicative of a person's prior step—and thus such processed data may undergo further processing in order to e.g. mark a detected obstacle in the current real time field of view and/or image presented to a user e.g. in or representing the walking step he is currently taking.

In at least certain embodiments, a depth camera included in the first sub-system may function to scan the walking surface, measure distances, possibly also image feet of the person, and transmit image parameters with the pixel distance parameters of the sampled area.

In at least certain embodiments, image processing techniques may be employed using computer vision or machine learning methods—in order to identify and characterize obstacles (e.g. foot-dependent obstacles). In certain cases, obstacles may be characterized according to proximity to where a user plans laying down his/her feet on a ground face, e.g. proximity to a current walking step being taken or to a subsequent step thereafter (and so on).

In at least certain embodiments, image processing may create a time lag, which in certain cases may be overcome by a tracker, so that the person will eventually see the obstacles detected in such processing in real time and in a substantial precise location on the walking surface.

In at least certain embodiments, the first and second sub-systems may include a repair mode for repairing gathered data (e.g. image data)—where such repair may be required due to tremors (or the like) formed during a person's movement that affect data acquisition.

In at least certain embodiments, since inter-camera correlation may be performed at a different time instances, and distances between axes (beacon and vision) may be coordinated between the IMUs, the depth camera products may be used after activating the tracker, as an estimation for inter-camera correlation.

In a non-binding example, use of a system and/or method according to at least certain embodiments may be defined according to a time line starting at time "zero". A person may be defined as beginning his/her walk at time "zero" whereupon the depth camera at the first sub-system may start recording a series of depth images.

After lapse of a (possibly pre-defined) time span "$T_{rec}$", processing of the recorded depth images obtained during this previous time span may take place in order to detect suitable 'useful' images e.g. of the path ahead of the user (e.g. while ignoring "blurry" images resulting from instability of the camera or the like). Such detection of 'useful' images may take an additional time span "$T_{use}$".

In certain embodiments, each recorded depth image may be substantially immediately processed to determine if it qualifies as a 'useful' image, and hence the time span of this processing to determine "usefulness" may introduce a relative short delay "$T_{use}$" (possibly several milliseconds), which it takes until an image is verifies as 'useful'.

Identification and determination of obstacle(s) within a 'useful' image and their location within one or more of the 'useful' images may take yet an additional time span "$T_{det}$" and mapping detected obstacles onto a real-time field of view of the user may take an additional time span "$T_{map}$".

Thus, an overall time "lag" between "processed" image data and indication of such data in a real-time field of view may include at least some of the time spans: Trec+Tuse+Tdet+Tmap (e.g. Tuse+Tdet+Tmap).

According to various embodiments, display of obstacles may be accomplished according to any one of the following (including combinations between some of the following).

In certain cases, display of obstacles may include use of the AR lens where such display may be according to orientation provided by the IMU or by an AR camera placed on the AR lens.

In certain cases, display of obstacles may be facilitated by correlation between a laser scanner and a depth camera of the first sub-system.

In certain cases, a smartphone screen may be used for display of obstacles, possibly according to its gauges and camera(s)—and hence in at least certain system embodiments act as the system's second sub-system. In yet further cases, functionality of both the first and second sub-systems may be implemented by a mobile device (such as a smartphone) and thus both the first and second subsystem may be "unified" by a mobile device.

According to various embodiments, indication of alerting about presence of obstacles may be via vibration (e.g. a vibrating bracelet), via a headset of the user (possible utilizing AR technology and/or audio signals) that may be connected to a computer on the display module.

According to various embodiments, distance of the obstacle from the person may be defined according to the distance measured by a depth camera or by distance in a parameter of steps (i.e. number of steps that a person has until the barrier, distance in meters that can be determined from the depth camera, etc.).

In at least certain embodiments, an IMU may also measure pelvic movements, reflecting human steps.

In at least certain embodiments, GPS and/or simultaneous localization and mapping (SLAM) may enable studying of walking habits along a fixed or familiar route, to create a data set defining obstacles lying along such route alongside previous walking paths that "succeeded" in avoiding the obstacles (e.g. where the person didn't fall of encounter difficulty).

In at least certain embodiments, a system may provide an emergency button where upon a health event, automatic reporting of the person's condition may be transmitted to suitable authority. A system in certain embodiments may study a person's walking activity and e.g. upon fall event may trigger an automatic report.

In certain cases, acoustic sensors may alert a user of obstacles in his/her perimeter.

In at least certain embodiments, a system according to various embodiments of the invention may focus a user's eyes on walking in order to limit likelihood of falling or tripping. Increase in likelihood of falling may occur while attention is drawn away from walking, such as when walking and talking with a companion, looking at a roadside plants (or the like). Therefore a system may be tuned to keep the person's focus on walking.

In accordance with one example, this may be accomplished by measuring a distance between IMUs fitted to the two sub-systems possibly tracking changes in orientation of each one of the 'beacon' and 'vision' coordinate-systems or at least the 'beacon' and 'vision' axes. In addition or alternatively, adjustment may be made according to image data between an image obtained by the depth camera at the first sub-system and an AR or regular lens camera at the second sub-system.

Thus, the aforementioned IMU and/or Image based comparison, in at least certain embodiments may assist in detecting if distance/difference between the user's attention as indicative by comparison between the first and second sub-systems is too large (e.g. the user's attention appears to be distracted and not focused on an obstacle ahead).

In at least certain embodiments, adjustment/calibration between IMUs tracking location/orientation of the first and second sub-systems—may be periodically performed, e.g. every few minutes, since cumulative deviations between actual and assumed locations of the sub-systems may occur. A synchronization/re-calibration method may include determining a point in the center of the field of view of the depth camera, to which the AR camera (via image adjustment) may be synchronized and to which the IMU gauges may be synchronized.

In accordance with certain embodiments, an initial matching may require an appropriate alert. If a distance between the IMUs or cameras is too large, an appropriate alert and option for a virtual symbol display on the AR lens may be provided. Gyro may be used to allow a person to keep the walking direction, and the lens measurements to keep the barrier oriented. In certain cases, Gyro calibration may be included in IMU calibration.

Since studies show that between about 90% and 50% of the time people look downwards during walking, possibly towards a walking surface, and not necessarily focused on further ahead to foresee impending barriers—at least certain embodiments of a system according to the present invention may accordingly by fitted with a first sub-system aimed to sense along a beacon-axis.

Such first sub-system (possibly on or adjacent a waist region of a user) may include a utility of sensing/looking ahead towards a walking direction of a person in order to "expand" a pedestrian's "visual field" so that an obstacle can be alerted, even though the pedestrian may be looking in another direction (e.g. down).

Such "expansion" may be by providing indications to the user within a field of view tracked by a second sub-system aimed along a vision-axis—of occurrences taking place outside of his/her visual field.

According to at least certain embodiments, a criteria for determining that a user's eyes are focused towards a detected obstacle may be defined by IMUs coupled to the first and second sub-systems, respectively—for example by the 'beacon' and 'vision' axes of the first and second sub-systems, respectively—tracked by respective IMU's coupled to said axes. In certain cases, a slanting angle derivable from an IMU coupled to the second sub-system, may be indicative of attention of the person being drawn to an obstacle e.g. on the ground ahead.

For example, the 'beacon' axis may define an axis or route of advancement along which detected obstacles pose potential hazards to a user—and divergence of the 'vision' axis from the 'beacon' axis may be indicative of distraction of the user from potential obstacles ahead.

Such divergence may be assessed by projecting the 'vision' axis onto a plane generally defining the ground face to form a 'projected vision' axis and then deriving a slanting angle between such 'projected vision' axis and a respective projection of the 'beacon' axis on said same plane. A slanting angle exceeding a pre-set, possibly adjustable, angle threshold may be indicative of distraction of the user away from potential obstacles.

Other criteria's may be defined by correlation between sets of pairs of images, one taken by a camera (e.g. depth camera) coupled to the first sub-system and another by a camera (e.g. AR camera) coupled to second sub-system. If such correlation e.g. shows that the user's eyes are focused on an obstacle close by to the user.

In at least certain embodiments, means such as a vibrating bracelet may alert a user of obstacles outside of his/her attention or e.g. a possibly head set at the second sub-system may be utilized for bringing the user's attention to look at an impending obstacle. If a person e.g. does not indicate awareness to such indications—a subsequent appropriate alert may be provided aimed at further alerting the user to possibly stop and avoid from encountering the barrier—e.g. by providing suitable indications on a screen of a head set (e.g. using AR technology) or a suitable alert tone emphasizing required focus of his/her vision.

In an aspect of the present invention, at least certain system embodiment may be employ learning techniques for assisting in avoiding accidents in a known, possibly closed environment, such as a home of a user.

To reduce likelihood of accidence from occurring—a home environment of a person (e.g. elderly person) may be suitably arranged and organized. Potential obstacles, such as carpets, stairs without a railing, narrow passage between a table with chairs and a wall, can increase likelihood for falls—and thus experts may assist in guide such people how to arrange their homes.

This may be accomplished by imaging a home environment so that a system according to certain embodiment of the invention may study the home organization and make sure a required order (possibly pre-defined order e.g. dictated by an expert) is maintained.

In at least certain embodiments, a system may be tuned to learn how to organize a home environment of a given user—via information available from homes of possibly other users that have been adjusted for safety. Such systems—may then be arranged to provide at least partial recommendations on home organization to their given user.

Since a home environment may a changing over time (e.g. during daily use), at least certain systems of the invention may be arranged to image and process the environment while being used by a person in his/her home—and provide indications and possibly recommendations to the person of any changes in the environment (e.g. a displaced chair) that may increase likelihood for accidence and how same may be amended (e.g. return chair to its place).

In at least certain embodiments, a system may be arranged to track movements of a user in a given environment (e.g. a home environment)—in order assist in preventing a user from making risky actions or moves. For example, the system may process images (from one or more of the sub-systems) to assess if he/she intends (or actually is) standing on a stool in order to reach objects stored in a closet; if the user is wearing suitable shoes, e.g. without heels (and the like).

In at least certain embodiments, a system may be arranged to store (possibly in a cloud based data base) information relating to organization schemes of an environment (e.g. home environment).

In an aspect of the invention, at least certain system embodiments may be arranged to assess/measure/rate a user's confidence (e.g. level of stability)—by monitoring the user's posture e.g. during walking through the user's step pattern.

In certain embodiments, such assessment may be performed by comparing between a current real time walking pattern or analysis and a pre-measured/assessed normal or natural walking pattern of analysis.

For example, a pre-measured/assessed normal or natural walking pattern and current real time walking pattern of a user—may be obtained from data derived from a depth camera and possibly also an IMU on the first sub-system 11.

In cases where pre-measured and current real time walking patterns are derived from the depth camera—video imagery may be assessed to determine the walking pattern. Additional data possibly obtained by the IMU may assist in determining the direction at which the camera is aimed at, possibly in a Cartesian coordinate system $X1, Y1, Z1$ of the first sub-system 11.

In certain cases, real time data obtained by gyroscopes and/or accelerometers of an IMU that are affixed to a user, may be compared to prior recorded data of gyroscopes and/or accelerometers of said same user—in order to monitor in real time changes in a walking pattern of such a user.

Therefore, in certain embodiments, the first sub-system 11 may be used alone and not necessarily in combination with the second sub-system 12 in order to monitor a walking pattern of the user, e.g. in cases where recognition of obstacles 18 to the user in such a sub-system 12 is not essential and/or required. FIG. 7 schematically illustrates such an embodiment absent of a second sub-system.

Such data relating to a walking pattern of a user may include measurement of walking parameters, such as each leg's stride length, velocity, walking symmetry, tiredness, a user's center of mass (etc.) and/or possibly monitored angular changes in the Cartesian coordinate system $X1, Y1, Z2$ derived from the IMU.

Comparison to pre-measured/assessed normal or natural walking pattern of a user may assist to derive if a user's current walking pattern may be indicative of potential problems such as falling, losing balance (etc.), and may possibly be derived in real time. The pre-measured/assessed normal or natural walking pattern of a user may be derived e.g. also from performing a so called 'timed up and go' (TUG) test, where the users sits on a chair—stands up—and returns to sit down.

Comparison to pre-measured/assessed normal or natural walking pattern of a user may assist also to derive if a user's current walking pattern may be indicative of lack of response or attention e.g. to an incoming obstacle detected by a depth camera of the first sub-system 11.

Attention is drawn to FIGS. 9 showing a user advancing in a forward direction and equipped with a sub-system or system attached to his/her waist in this example by means of a belt like attachment. The system in this embodiment includes an IMU and a depth camera that is aimed at the direction of advancement, where both the IMU and camera are attached to the user's center of mass at the waist.

Machine and/or deep learning techniques or other algorithm implementation techniques may be used to assess from data measured of leg's stride length, velocity, walking symmetry, tiredness (etc.) possible indication of neurological problems (or the like) relating to the person. In certain cases, detection of a problem in walking may trigger need for medical attention to the user, and the system may assist by communicating to a physician data that can allow to perform diagnostics to the user, possibly remote diagnostics.

Possibly such assessment may be assisted via a camera (e.g. depth camera) fitted at the first sub-system that may be tuned to image the user's steps. Further possibly (or alternatively) IMU's fitted to one of the sub-systems (e.g. first sub-system fitted to or adjacent a user's waist region) may provide information that may be processed to indicate stability of a user.

In at least certain embodiments, analysis of a user's steps may provide insight into the safety and stability of a walk activity of the user. For example, assessment may be made in order to identify any of the following: uniform size of the step, changes in the size of the step as a function of walking time, the quality of the walk (etc.), walking speed, symmetry of steps, change in symmetry, and the like.

Such data in at least certain cases may be used to guide the walking of a person, possibly indicating to the user changes/adjustments to be made—in order that he/she move more carefully, rest if needed (etc.). For example, aspects monitored may be any one of: gait speed (meter/second), stride length (meter), stride time (second), swing time (%), asymmetry, and step width (centimeter).

In at least certain embodiments, measurement of stride length may be done by tracking distance between subsequent images obtained by one of the sub-systems (e.g. the first sub-system) and then dividing the distance by the number of steps taken by a user between such images. In one example, the number of steps may be derived from an IMU e.g. fitted to one of the sub-systems.

In one example, images obtained by a depth camera, e.g. comprised in the first sub-system, may be processed to detect where one or more specific objects/potential-obstacles are located in each one of said images. A distance between such one or more specific objects may be derived from distance measurements obtained by the depth camera, and the number of strides a user took in between the instances when such images were taken—may be obtained from an IMU comprised in (or associated with) the sub-system comprising the depth camera—since from IMU data it is possible to compute occurrences of strides (and the like).

Such assessment may permit a system employing the above to determine if a user's stride differs from e.g. his/her normal stride—a finding that if present may hint that the user may be encountering difficulty in his/her walking. This in turn may trigger an alarm e.g. communicate to the user in order to drawn his/her attention to such matter (or the like).

In certain cases, collecting data (e.g. from cameras on any one of the sub-systems) may be timed to any one of: during walking, at a time interval around an incident (e.g., a fall or a near fall). Possibly, such data may be obtained from a camera of the first sub-system (e.g. a depth camera), IMUs (etc.).

In at least certain embodiments, a system may be provided with at least some of the following data regarding a user: a list of medications of the user, blood pressure measurements, exercise routine (etc.). In some cases, such data may be entered to the system via a user interface. Data may be stored within the system or possibly in the cloud.

In an aspect of the invention, at least certain system embodiments may be suited to learn, guide and alert a user about safety issues within his/her environment (home). For example, at least some of the following may be envisioned: gas shutdown, power off, heater shutdown, home lock, water tap closure, (etc.). The system e.g. via Deep Learning algorithms, may detect that a user after operating a utility forgot to turn it off and hence may indicate to the user this fact. For example, to close a gas oven he previously activated (or the like).

In an aspect of the invention, at least certain system embodiments may be suited to address safety in a working environment, such as factory safety system. A system fitted to employees/workers in such environment may be suited to identifying relevant pitfalls and hazards e.g. due to liquidity of a floor such as oil, metal cutting (etc.).

In at least certain embodiments, a system suited for a working environment (possibly industrial working environment) may be arranged to include the first and second sub-systems on a safety helmet of a user.

In an aspect of the present invention, at least certain system embodiments may be tuned to detect obstacles and alarm the user if he is detected as using his/her mobile device during movement (e.g. walking). For example such system may be tuned to alarm while walking down a staircase.

Research on effects of smartphone use on behavior while walking, indicate that people who use a cellphone screen while walking are looking at the walking route only about 30% of the time.

Thus, in at least certain embodiments, a system may be arranged to utilize a first sub-system for observing scene ahead in the walking direction and a mobile device (e.g. smartphone) as the second sub-system for providing alerts to a user on the mobile's display to possible obstacles ahead.

In certain embodiments, the first sub-system directed to the direction of walking may be integrated into a mobile device (such as a smartphone), while possibly fitting a depth camera to the mobile device, possibly via a gimbal.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIGS. 1 and 2 show a side view and FIG. 3 a top view of the user and system;

Figure 1:
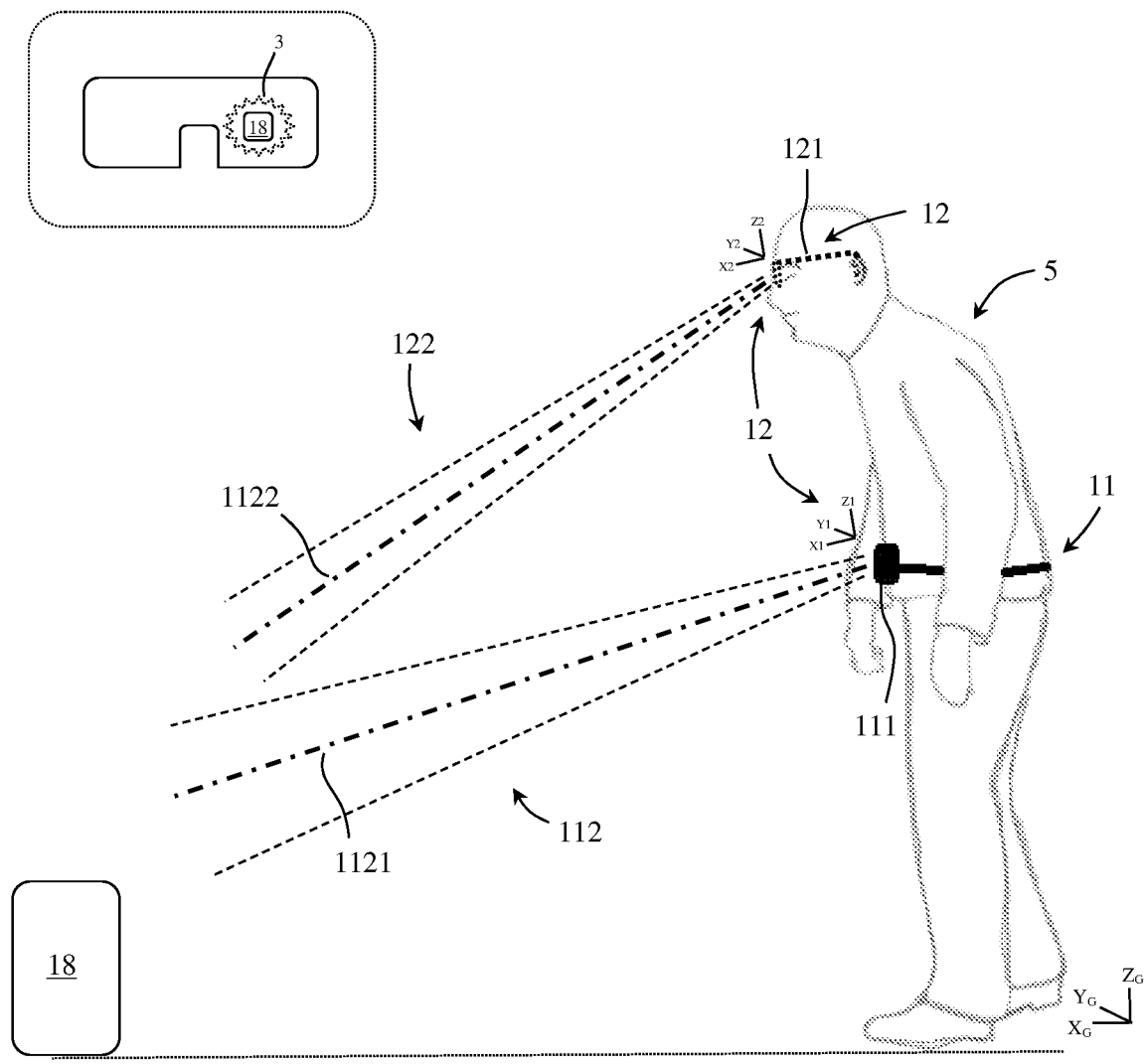
FIGS. 1 to 3 schematically show a walking assisting system in accordance with at least certain embodiments of the present invention, fitted to a user viewed in different postures, where

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically showing a user 5 fitted with a walking assisting system 1 according to at least certain embodiments of the invention. System 1 in this example is shown including a first sub-system 11 and a second sub-system 12. First sub-system 11 is here illustrated fitted to a waist region of the user and second sub-system 12 to a head of the user.

First sub-system 11 includes in this example a sensor 111 aimed at a generally frontal direction directed towards a direction of advancement of the user during walking. In certain embodiments, sensor 111 may be embodied as a depth camera. Second sub-system 12 in this example is embodied including sensor 121 in the form of wearable computer glasses that are arranged to add information alongside or to what the users sees.

The sensor of the of first sub-system 11 when embodied as a camera may be arranged to have a field of view (FOV) 112 that has a central axis 1121 generally extending towards and/or along a center of FOV 112. The sensor of the second sub-system 12 when embodied as a camera may be arranged to have a field of view (FOV) 122 that has a central axis 1122 generally extending towards and/or along a center of FOV 122.

In certain cases, each one of the sensors 111, 121 may be adapted to sense information in a respective local coordinate system. In the illustrated example, a first coordinate system (denoted by a Cartesian coordinate system X1, Y1, Z1) is shown affixed to the first sub-system 11 and a second coordinate system (denoted by a Cartesian coordinate system X2, Y2, Z2) is shown affixed to the second sub-system 12. Hence, sensed data (such as image data captured by a camera type sensor) of any one of the sub-systems 11, 12 may be obtained in the respective local coordinate system of the sub-system.

In accordance with various embodiments of the present invention, means may be employed for transforming and aligning data sensed by both the first and second sub-systems one towards the other and/or into a global coordinate system (denoted by a Cartesian coordinate system $X_G$, $Y_G$, $Z_G$).

In certain cases, such transforming and aligning may be facilitated by processing information in respective images captured by the first and second sub-systems, and/or by fitting devices such as Inertial Measurement Units (IMU) to both sub-systems in order to track their respective movements in space.

In an aspect of the present invention, the first sub-system 11 may act for monitoring possible obstacles 18 located ahead of the user that may be assessed for determining potential hazard to the walker. Such sensed data may then be provided to the user via various means, such as in the present example, as added information alongside to what the users sees.

The dotted rectangle at the upper left side of FIG. 1 (and FIGS. 2 and 3) represents what the user may see through his/her wearable computer glasses and since the example in FIG. 1 demonstrates that the user's attention being focused ahead to his/her direction of advancement—obstacle 18 may be seen in this view. Around obstacle 18 a marking 3 may be added to highlight the detected obstacle. Such marking 3 may be added due to processing taking place, e.g. in a processor included in the first sub-system, dictating that the obstacle poses a hazard that should be reported to the user.

In certain cases, a potential hazard posed by a detected obstacle may be reported to a user via other means, such as by any one of: sound, vibration, visual indication by a marker (e.g. a laser marker pointing to the obstacle) and the like.

Figure 2:
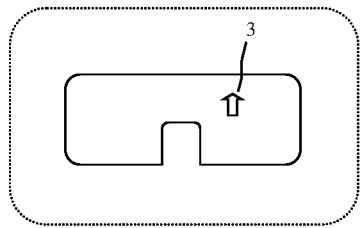
Figure 2:
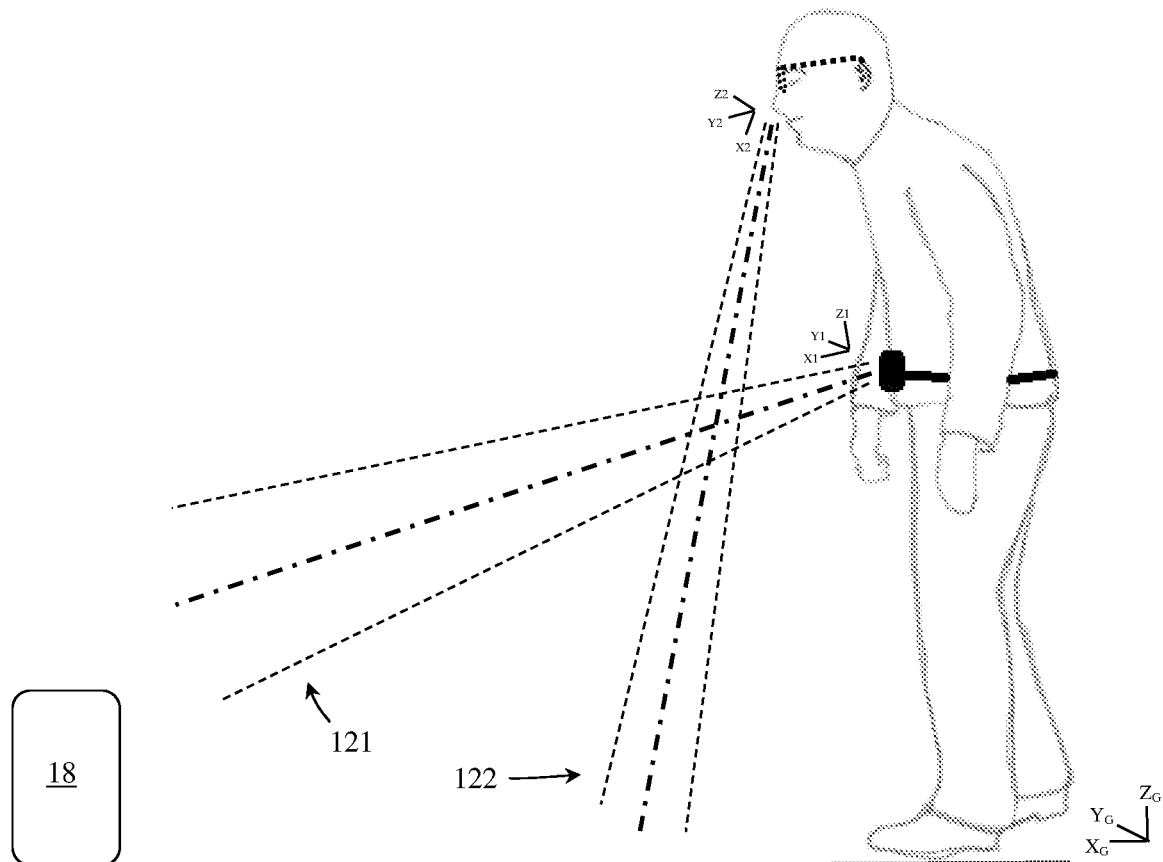

Attention is drawn to FIG. 2 illustrating a scenario where the user's attention is drawn downwards to his/her close vicinity in order e.g. to be cautious with a next walking step being taken. In such a scenario the user may not be aware of the upcoming obstacle ahead that is not in his/her FOV and hence may similarly be provided with a marking 3 here in the form of an arrow encouraging him to look upwards.

Figure 3:
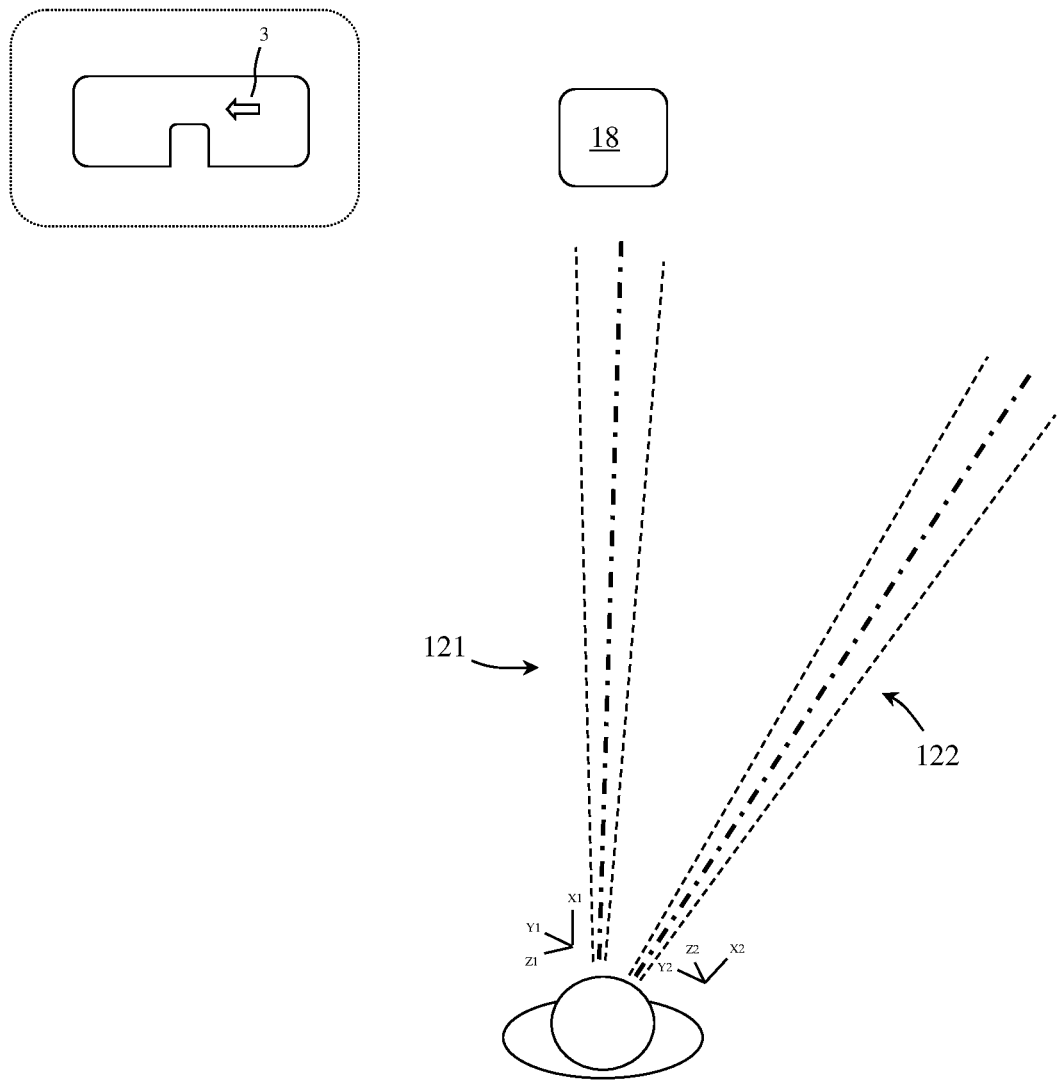

Attention is drawn to FIG. 3 illustrating a scenario where the user's attention may be drawn sideways and thus again the user may not be aware of the upcoming obstacle ahead that is not in his/her FOV. Similarly a marking 3 here in the form of an arrow may be provided in order to encourage him/her to turn his/her attention back towards his/her direction of walking.

Figure 6:
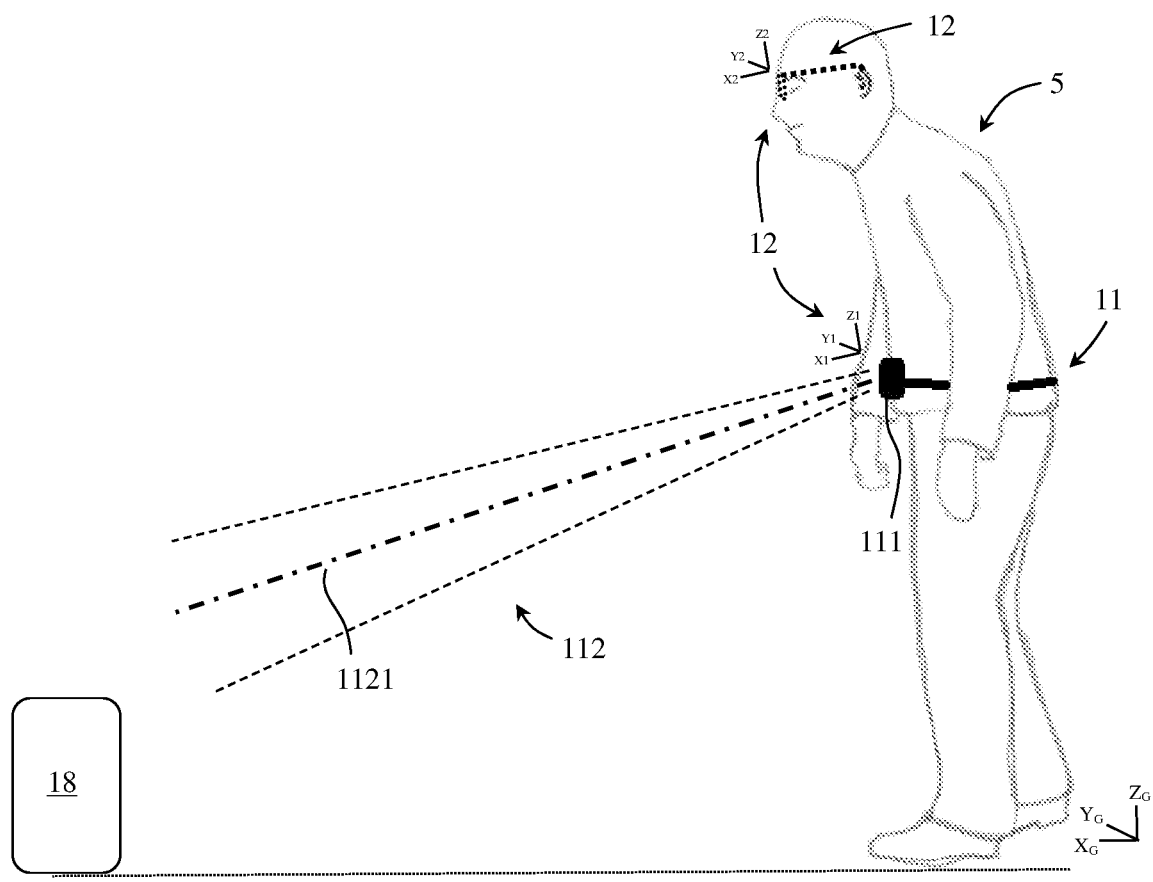
FIGS. 6 to 10 schematically show various walking assisting systems in accordance with further embodiments of the present invention.

In at least certain embodiments, the second sub-system 12 may be arranged to monitor a field of view (FOV) of the eyes of the user, while not necessarily making use of sensors in form of a camera. FIG. 6 schematically illustrates such an embodiment absent of a camera in its second sub-system 12.

Such monitoring and/or tracking of a FOV of the user's eyes may e.g. be accomplished by making use of a second sub-system 12 that only includes an IMU (and processor etc.) and using data derived from the IMU (i.e. from the inertial accelerometers) that is attached to the user's head region e.g. to his/her eyeglasses (or the like).

Typically, during an initial walking phase when starting to walk, people usually tend to look down towards their walking direction, before feeling secure enough to rotate/lift their heads upwards/sidewards (or the like). During such initial walking phase, the IMU accelerometers of the first sub-system 11 and of the second sub-system 12 may be synchronized to form a 'home' alignment, and from this point onwards monitoring of movement in head direction vs walking direction may be computed by comparing angular deviations of the second sub-system's IMU accelerometers from the 'home' alignment.

In a non-binding example, FIG. 2 may represent an initial walking phase of a user where alignment between accelerometers of the second sub-systems 12 IMU and accelerometers of the first sub-system's 11 IMU may be performed to compute a 'home' position of the user, and tracking of the FOV of the user's eyesight e.g. in FIG. 1 or 3 may be performed by computing deviations from this 'home' position.

Figure 4:
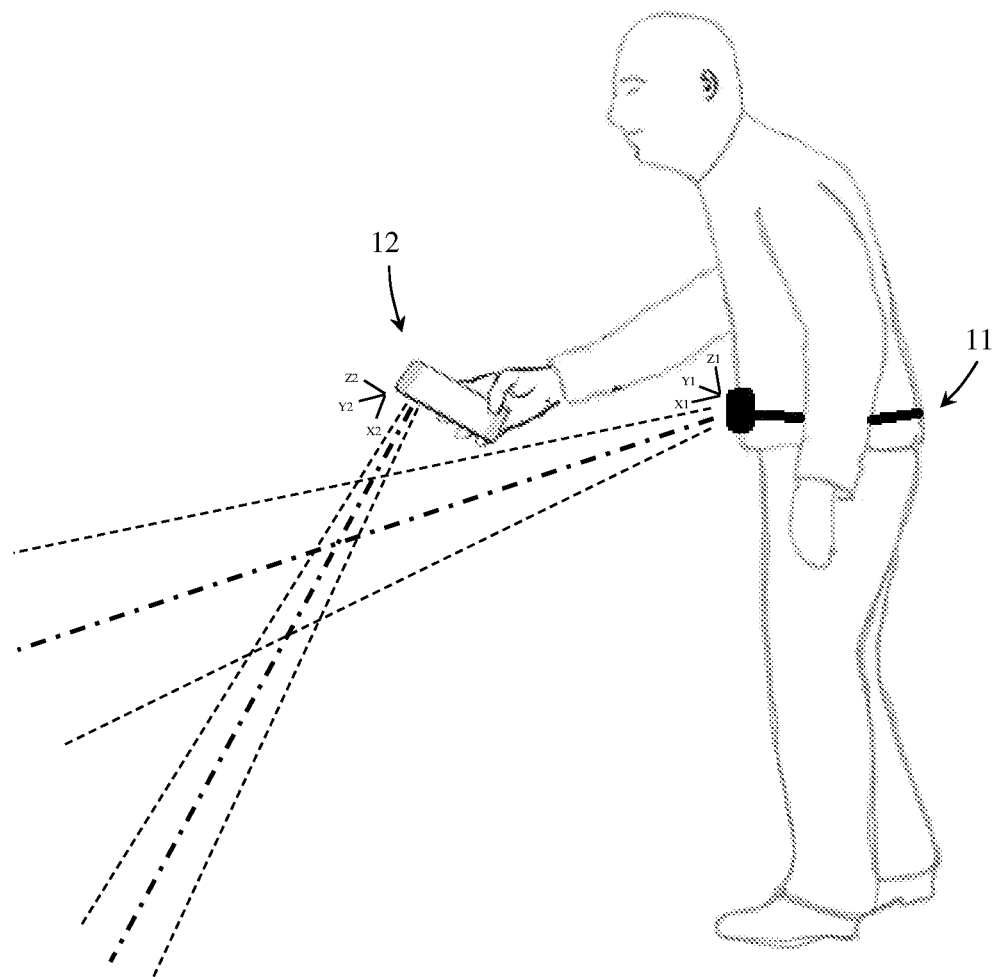
FIG. 4 schematically shows a further possible embodiment of a walking assisting system of the present invention.

Attention is drawn to FIG. 4 illustrating a system embodiment where a mobile device in this example held by the user may constitute the second sub-system. In other examples (now shown) other types of mobile devices may be envisioned, such as mobile devices designed to be worn on the user's wrist (e.g. a smart watch) or the like. A user may be provided as above with markings on his/her mobile device catching his/her attention as to obstacles or other notifications that the system may be configured to provide.

In certain cases, real time data obtained by gyroscopes and/or accelerometers of an IMU that are affixed to a user, may be compared to prior recorded data of gyroscopes and/or accelerometers of said same user—in order to monitor in real time changes in a walking pattern of such a user.

Figure 7:
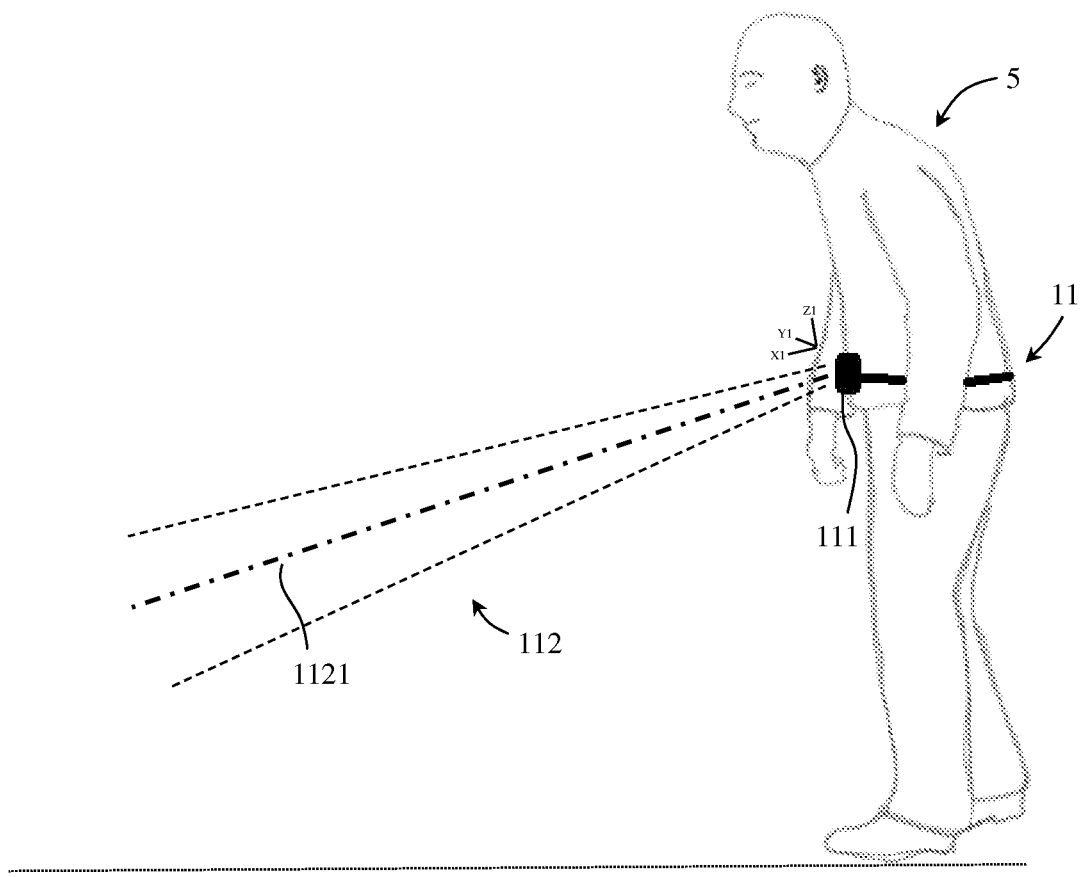

With attention drawn to FIG. 7, in certain embodiments a first sub-system 11 located at a user's center of mass at his/her waist—that includes a depth camera and an IMU may be used (not necessarily with sub-system 12) in order to monitor a walking pattern of the user.

Comparison to pre-measured/assessed normal or natural walking pattern of a user may assist to determine various aspects relating to the user, such as if a user's current walking pattern may be indicative of lack of response or attention e.g. to an incoming obstacle detected by a depth camera of the sub-system (or system).

Figure 9:
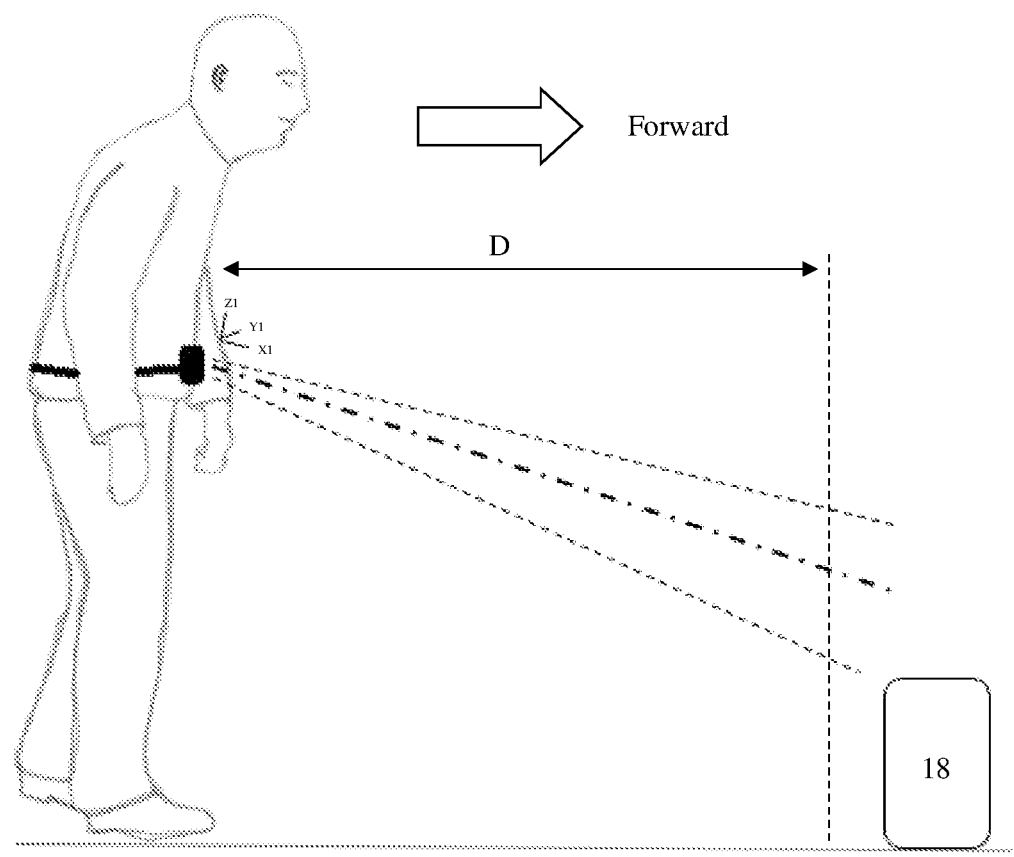

Attention is drawn to FIG. 9 showing a user advancing in a forward direction and equipped with a sub-system attached to his/her waist in this example in a belt like arrangement. The sub-system in this embodiment includes an IMU and a depth camera that is aimed at the direction of advancement, where both the IMU and camera are attached to the user's center of mass at the waist.

Attachment of such sensing devices to a center of mass of a user at the waist has been found by the inventors as advantageous in monitoring walking kinematics of a user. For example, a walking pattern of a user may be sensed by accelerometers of the IMU that collect the user's body acceleration, while the gyroscopes of the IMU detect rotation of the user's waist within a walking cycle and thus can be used to detect changes in walking strides/patterns of a user.

In FIG. 9 a user advancing towards an obstacle 18 is seen. A depth camera of the waist sub-system can be used to detect such an obstacle and provide a distance to the obstacle in real time.

In certain cases, a trigger distance D may determine a distance to an obstacle below which alerts may be provided to a user. The trigger distance D may be specific to a user and may be determined e.g. according to prior history of the user's walking patterns (and the like).

Figure 10:
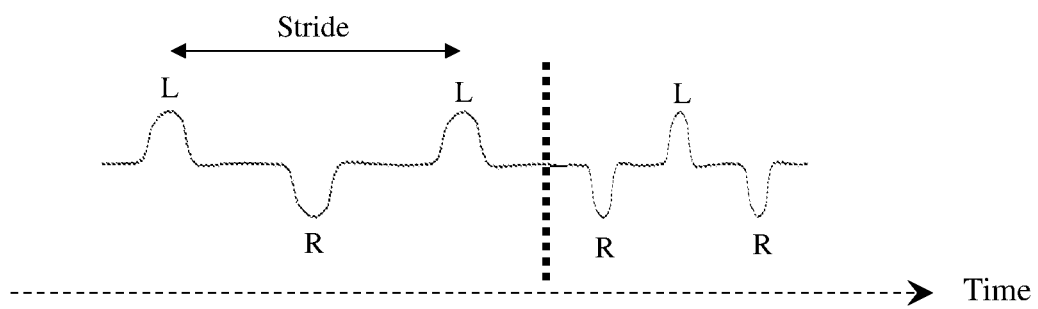

Attention is drawn to FIG. 10 providing a rough schematic illustration of signals picked up by a gyroscope of an IMU over a time span during walking of a user such as that seen in FIG. 9, which is equipped with a sub-system that includes a depth camera and an IMU affixed to the user's waist.

With progression of time during a walking action of the user, the signals picked up by the gyroscope can be seen indicative of steps accomplished by the user's right R and left L legs. As seen in this example, the sensed steps are initially at a first frequency that then change (at the vertical 'dotted line') to a second frequency, which in this example is higher than the initial more lower frequency. The frequency here is measured by the sensed stride of the user as picked up by the gyroscope, which stride as seen changes at the 'dotted line' in this example to be shorter.

Providing an alert to a user in certain cases may be dictated according to sensed data arriving from the IMU, in this example from one or more of the gyroscopes of the IMU. A change in frequency of a signal picked up by a gyroscope may be indicative for example of the user being aware of the obstacle, and hence providing an additional alarm to the user may be avoided. In other cases, absence of change in frequency or a change indicative of lack of attention to the obstacle may activate an alarm to the user of proximity to the obstacle.

In embodiments where alerts are provided to a user only when the distance to an obstacle is below the trigger distance 'D', such alarms may be activated only when the distance to the obstacle as picked up by the depth camera is below the trigger distance 'D'.

Figure 8:
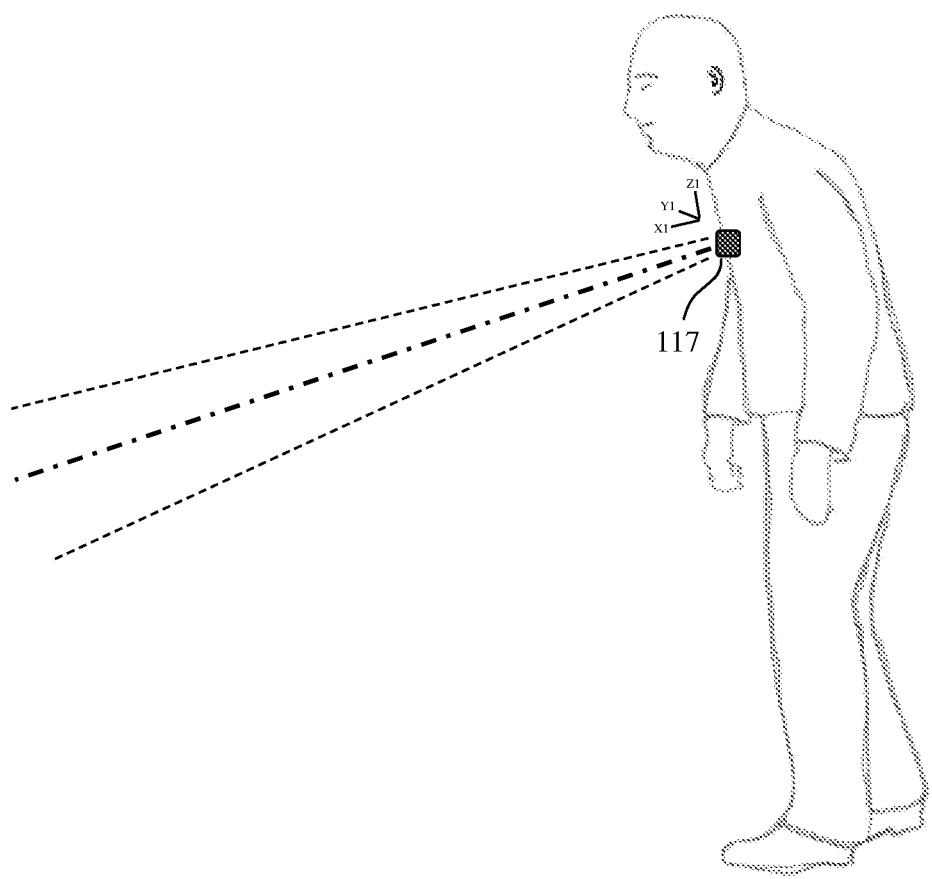

In cases where presence of the first sub-system 11 may be inconvenient and/or unsuitable, such as when walking within a home environment and/or when the user is elderly—certain system embodiments, may be arranged to operate instead with a smaller module (SM) sub-system 117. FIG. 8 schematically illustrates one possible example of such an embodiment.

For example, a home environment where a user moves within a known given location, may permit monitoring a user without need of the more bulky first sub-system being fitted to the user.

In certain embodiments, instead of the relative more bulky first subsystem with its depth camera, IMU, power source, processor (and the like)—an SM sub-system 117 may include a relative smaller and simpler camera, IMU, processor (and the like) that may be attached to the users' clothing (or the like). In certain cases, styles static photos/images provided via such SM sub-system may be useful in assessing a location of the user within his/her home environment.

Such styles photos may be obtained in certain embodiments from a video stream possibly taken by the SM sub-system's camera—wherein such styles photos may be compared with prior obtained images and/or video of the home environment obtained by e.g. a depth camera (or the like). Comparison between image data from the SM sub-system and prior taken image data—may lead to obstacle detection (or the like).

An SM sub-system 117 may be suitable for use e.g. with a relative smaller processor and IMU. In a non-binding example such SM sub-system may include at least one of: an ESP32-CAM camera module, a Raspberry Pi Zero W processor, a Raspberry Pi Camera, an IMU such as the ADXL345 3-axis accelerometer (or the like).

In certain cases, an SM sub-system 117 may be fitted to a user's shirt or may be hand held—and when a user starts walking, images from the SM sub-system may be transferred (e.g. via WIFI) possibly as low rate video (e.g. video rate of about 2, 3, 4 images per sec) or sequence of styles photos to a larger CPU possibly located outside of the user (e.g. within his/her first sub-system 11 currently not in use), where alignment/correlation between images from the SM sub-system and prior obtained image data may be performed.

Such prior taken image data may be derived from a video stream (image library)—and may be used to alert a user e.g. if identification is made that a current image taken by the SM sub-system while walking may be in a vicinity of a potential obstacle. Provision of image data within such image library, which were taken by a depth camera, possibly the depth camera of the first sub-system 11, may assist in providing distance to such obstacle(s).

Figure 5A:
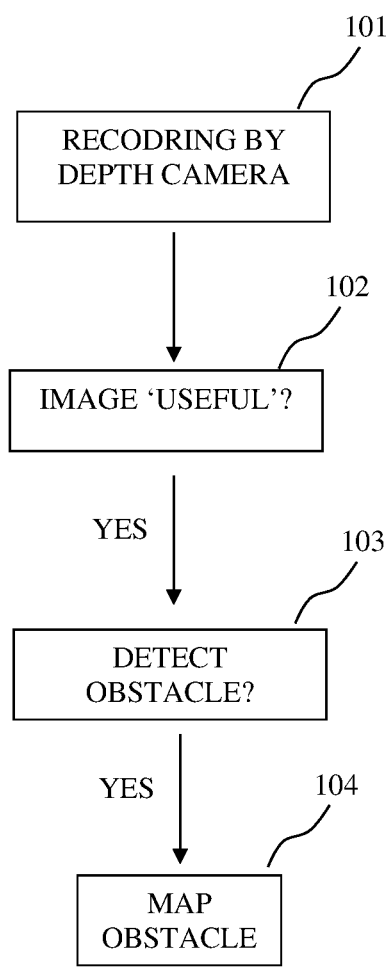
FIGS. 5A and 5B schematically show a flow diagram relating to at least certain system embodiments and a possible time-lag aspect relating to such diagram.

Attention is drawn to FIG. 5A illustrating a flow of data that may be performed by the system possibly by processors located within the first or second sub-systems. Block 101 represents a step of gathering sensed data, e.g. via the depth cameras of the first sub-system.

Possibly each image obtained may be assessed at step 102 to determine if it is 'useful'. Such 'usefulness' may be defined by assessing if the image captured an area of interest (e.g. a route ahead while walking). For example, due to movements of a user during walking, the sensor may move while taking an image resulting in a blurry image. Or, the sensor may momentarily aim at a different direction (e.g. upwards towards the sky) and thus not contain information representative of the area of interest.

Image data (either with or without determination of 'usefulness') may be processed at step 103 to detect objects of interest within the images, such as potential obstacles that may impede a user's walking.

Objects of interest detected within an image taken by the first sub-system may then at step 104 undergo mapping to compute their position in the user's current position of the first sub system or second sub-system's FOV. This may be accomplished by applying a transformation (possibly a matrix or coordinate transformation) for formulating the coordinates of a detected object in the second coordinate system in terms of the coordinates where it was detected in first coordinate system.

Preferably, the real time location of the second coordinate system may be taken for such formulation—so that the detected object and/or markings relating to such object may be correctly placed in the FOV of the second sub-system to the user.

Figure 5B:
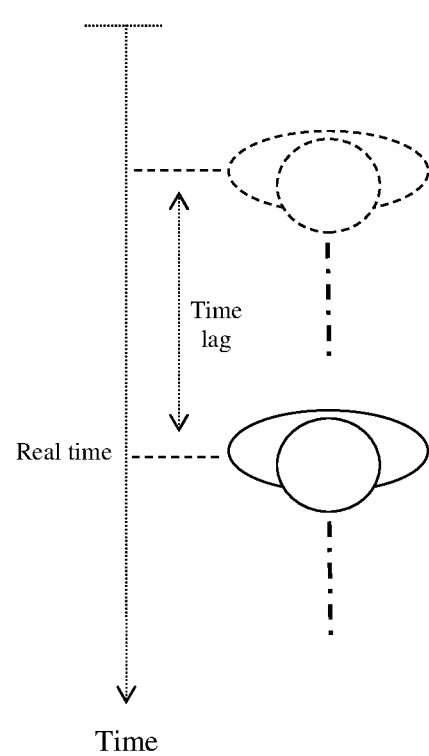

FIG. 5B schematically illustrates in dashed lines a user's previous location (e.g. while walking) during which an image taken by the user's first sub-system was obtained. Due to processing time required for certain steps possibly taken as indicated in FIG. 5A, a "time lag" may exist between the images used for detecting obstacles by the first sub-system and the real-time location of the user when such detected obstacles may be mapped into the FOV of his/her second sub-system.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A walking assisting system for a user,
the system comprising first and second sub-systems, wherein
the first sub-system comprising at least one depth camera and an Inertial Measurement Unit (IMU) comprising three accelerometers and at least one gyroscope, and
the second sub-system comprising an Inertial Measurement Unit (IMU) comprising three accelerometers,
the first sub-system being a belt-mounted sub-system that is fitted to the user's waist, and
the second sub-system being fitted to another region of the user's body, wherein
the system being arranged during walking of a user to assess by the first sub-system a real time walking pattern of the user and obstacles in a footpath of the user and to align between data obtained from the first and second sub-systems in order to indicate to the user presence of such footpath dependent obstacles detected by the first sub-system in a coordinate system of or related to the second sub-system,
wherein the walking pattern is derived by measuring at least one of the following parameters: leg's stride length, velocity, walking symmetry, tiredness, a user's center of mass and/or monitoring angular changes in the Cartesian coordinate system derived from the IMU; and
wherein a pre-measured or the assessed normal or natural walking pattern is derived from a timed up and go (TUG) test.

2. The walking assisting system of claim 1, wherein accelerometers of an IMU are arranged to derive the Cartesian coordinate system associated to a sub-system including the IMU.

3. The walking assisting system of claim 1, wherein the optical sensor of the first sub-system is arranged to sense towards a direction of movement of the user, for example a walking direction of the user.

4. The walking assisting system of claim 1, wherein indication to a user of presence of obstacles is by any one of: augmented reality technology, sound, vibration, visual indication by a marker.

5. A method for assisting a user in walking comprising the steps of:
providing a system comprising first and second sub-systems wherein the first sub-system comprising at least one depth camera and an Inertial Measurement Unit (IMU) comprising three accelerometers and at least one gyroscope, and the second sub-system comprising an Inertial Measurement Unit (IMU) comprising three accelerometers,
fitting the first sub-system as a belt-mounted sub-system to the user's waist,
fitting the second sub-system to another region of the user's body,
deriving a walking pattern by measuring at least one of the following parameters: leg's stride length, velocity, walking symmetry, tiredness, a user's center of mass and/or monitoring angular changes in a Cartesian coordinate system derived from the IMU;
wherein a pre-measured/assessed normal or natural walking pattern is derived from a timed up and go (TUG) test, and
wherein potential obstacles detected during walking of a user in coordinates of sensed data of the first sub-system data undergo transformation to be presented in a correct location in coordinates of sensed data of the second sub-system.

6. The method of claim 5, wherein accelerometers of an IMU are arranged to derive the Cartesian coordinate system associated to a sub-system including the IMU.

7. The method of claim 5, wherein the optical sensor of the first sub-system is arranged to sense towards a direction of movement of the user.

8. The method of claim 5, wherein indication to a user of presence of obstacles is by any one of: sound, vibration, visual indication by a marker.

9. A walking assisting system for a user comprising a belt-mounted sub-system that is fitted to the user's waist, wherein the sub-system comprising at least one depth camera and an Inertial Measurement Unit (IMU) comprising three accelerometers and at least one gyroscope, wherein real time data obtained by the sub-system during walking of a user is arranged to assess a real time walking pattern of the user and alert the user of obstacles in his/her footpath in response to the real time walking pattern;

wherein deriving a walking pattern comprises measuring at least one of the following parameters: leg's stride length, velocity, walking symmetry, tiredness, a user's center of mass and/or monitoring angular changes in the Cartesian coordinate system derived from the IMU; and wherein the pre-measured/assessed normal or natural walking pattern is derived from a timed up and go (TUG) test.

10. The walking assisting system of claim 9, wherein assessing a real time walking pattern of the user comprises comparing to a pre-measured/assessed normal or natural walking pattern of the same user.

11. The walking assisting system of claim 9, wherein the real time data obtained by the sub-system during walking of a user is arranged to assess also obstacles in a footpath of the user.

12. The walking assisting system of claim 9 and being arranged to synchronize between measurements made by the camera and the IMU.

13. The walking assisting system of claim 9, wherein data obtained by the IMU is used for determining the direction at which the camera is aimed at.

14. The walking assisting system of claim 9, wherein providing an alert to the user is also determined according to a real time distance obtained by the depth camera of the user from an obstacle in his/her footpath.

15. The walking assisting system of claim 14, wherein the determining if to provide an alert is if the detected obstacle is below a trigger distance 'D' from the user in his/her direction of advancement.

16. The walking assisting system of claim 15, wherein the determining if to provide an alert to the user is according to sensed data obtained by the IMU.

17. The walking assisting system of claim 16, wherein changes in sensed data obtained by the IMU determines if to provide an alert to the user.

18. The walking assisting system of claim 17, wherein the changes in the sensed data are changes in sensed frequency of the stride of the user as obtained by the at least one gyroscope.

* * * * *